Patented May 18, 1954

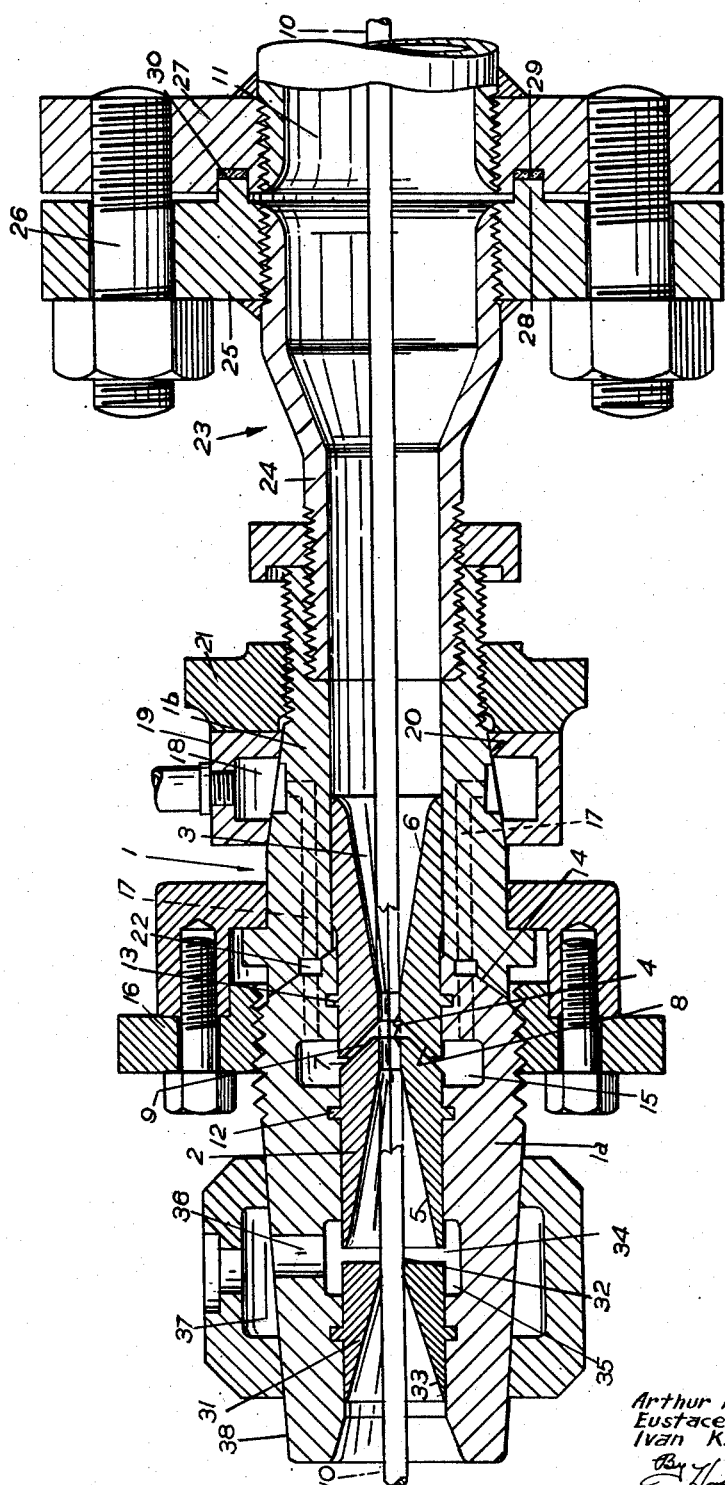

2,678,838

UNITED STATES PATENT OFFICE 2,678,838

SEALING GLAND

Arthur Bruce Fraser Gillespie Richardson, Eustace Tunnicliff, and Ivan Kenneth Fisher, Leigh, England, assignors to British Insulated Callender's Cables Limited, London, England, a British company Application September 21, 1949, Serial No. 116,995

Claims priority, application Great Britain October 11, 1948

9 Claims. (Cl. 286—16)

This invention relates to a sealing gland for preventing fluid under high pressure contained in a vessel from escaping at the point of entry into the vessel of a relatively moving elongated body, or reducing the rate of escape. It is particularly but by no means exclusively adapted for use with a continuous vulcanising machine comprising an elongated chamber containing steam or other hot fluid under high pressure and through which a rubber covered conductor or a rubber covered cable core is continuously passed whereby the rubber covering is vulcanised during its passage through the chamber. Before it is vulcanised the hot freshly applied rubber covering is particularly liable to be distorted or otherwise damaged by rubbing contact with other bodies and to be deformed when subjected to localised pressure. In the past, difficulties have been encountered in providing a seal at the inlet end of the vulcanising chamber of a continuous vulcanising machine which will not damage the soft rubber covering of the conductor or core passing through it and yet will effectively prevent escape of steam or other vulcanising pressure fluid from the chamber.

Sealing glands have been proposed in which the pressure of the fluid in the vulcanising chamber or other vessel (hereinafter for convenience included in the term "vulcanising chamber") is substantially balanced by pressure of a liquid, generally cold water, supplied to the interior of the gland. The present invention provides an improved gland of this kind which is very effective in preventing the escape from the vulcanising chamber of steam or other fluid under pressure (hereinafter for brevity referred to as steam). The improved gland is axially short and of simple construction because it does not involve the provision of labyrinthine passages for preventing the escape of steam, or of water or other counter-pressure fluid, at high pressure. It is economical as regards the supply of counter-pressure liquid required and, most important of all, permits the passage of an unvulcanised rubber covered wire or cable core into the vulcanising chamber without impairing it in any way.

In our improved gland the water or other counter-pressure liquid is admitted to the clearance between the gland and the elongated body passing through it, in the form of an annular stream inclined with respect to the direction of travel of the body so as to have a substantial component of movement in that direction. We have found that this reduces the amount of counter-pressure liquid flow and also reduces the tendency of the counter pressure liquid to impair the surface of the soft rubber covering where it impinges upon it.

The improved gland has a passage for the cable or other article, which preferably includes a pair of substantially conical portions which converge towards a central throat portion of relatively short length. Around this throated passage for the cable is an annular chamber which communicates with the interior of the throat portion of the passage through an annular port in a circumferential wall separating the interior of the throated passage from the interior of the annular chamber. This port, or at least the innermost part of the port, is inclined at a substantial angle to the axis of the throated passage.

The gland is adapted to be mounted at the point of entry of the cable or other article into the vulcanising chamber, with its inclined annular port pointing towards the interior of the vulcanising chamber. When, under working conditions, cold water or other liquid, under a pressure equal to or slightly greater than the pressure of the steam in the vulcanising chamber, is supplied to the annular chamber around the throated passage of the gland, it flows through the inclined port in the form of an annular stream having a component of movement in the direction of travel of the cable or other article through the gland.

The angle of inclination of the annular port which opens into the throat of the gland will depend upon the speed of travel of the cable. The angle may be greater in the case of glands dealing with cable of small diameter that is travelling at high speed than is permissible in the case of glands dealing with larger cables travelling at slower speeds. For glands dealing with cable having a sheath diameter of about one quarter of an inch and travelling at speeds between ten and two hundred feet per minute, an angle of 40° to 45° has been found to be entirely satisfactory. For cables of other sizes and speeds the most satisfactory angle may be determined by experiment.

The accompanying drawing shows in longitudinal section an example of a sealing gland constructed in accordance with the invention and mounted on the inlet end of the vulcanising chamber of a continuous vulcanising machine for curing the rubber sheath of a flexible multi-core cable.

The gland shown in the drawing is built up of an outer body or holder 1 and of a core or centre which essentially consists of a pair of bushes 2 and 3 held in the outer body 1. The internal surfaces of these two bushes 2 and 3 are shaped to form a pair of substantially conical portions 5 and 6 which converge towards a central relatively short throat 4, which lies partly in one bush and partly in the other. Of the neighbouring conical end faces 7 and 8 of these two bushes, one forms a recess and the other a projection which points towards the outlet end of the gland and extends into the recess to leave a clearance between them which forms an inclined annular port 9 through which, under operating conditions, counter-pressure liquid is admitted to the clearance between the throat 4 and the cable 10 or other article passing through the gland into the vulcanising chamber 11. The two bushes 2 and 3 are axially positioned by collars 12 and 13 on their circumferential surfaces which enter circumferential grooves in the bore of the holder. Each of the bushes 2 and 3 is formed in two parts which make joint in a diametral plane.

The holder 1 consists of two parts, 1a and 1b, having conical joint faces 14 on their contiguous ends. The part 1a has in its internal surface a circumferentially extending recess which forms an annular chamber 15 around the throated passage of the core. From this chamber under operating conditions water or other counter-pressure liquid is fed to the inclined annular port 9. The part 1a is itself made in halves which make joint in a diametral plane. These halves are held together and secured to the other part 1b of the holder by screwing into a nut 16 made captive on the part 1b.

For the supply of water or other counter-pressure liquid to the annular chamber 15 around the throated passage of the gland, several longitudinally extending ports 17 are provided in the wall of the gland. At one end these ports open into an end wall of the annular chamber 15 and at the other end they open into the inner circumferential wall of a second annular chamber 18 longitudinally spaced from the first chamber 15. This second chamber is formed by a detachable, internally grooved ring 19 fitting on a conical portion 20 of the circumferential surface of the part 1b of the holder and held in place by a nut 21 on the externally screw threaded end of that part. Preferably the second annular chamber 18 lies near the outlet end of the gland so that when the gland is fitted at the point of entry to the vulcanising chamber 11, it forms a low temperature barrier to reduce the transfer of heat from the steam in the vulcanising chamber to the gland surfaces by conduction along the wall of the gland. This construction results in a portion of each port 17 being in the part 1a of the holder and a portion in the other part 1b. To obviate the need to register these ports when assembling the parts of the holder, a small annular chamber 22 may be formed at the joint between the conical joint faces 14, into which the ports open.

The gland is mounted on the inlet end of the tubular vulcanising chamber 11 by an adaptor 23 comprising a short tube 24 which is adapted at one end to screw into the internally screw threaded end of the part 1b and carries at the other end a flange 25 which is secured by stud bolts 26 to the flange 27 on the end of the chamber 11. Accurate alignment of the gland with the chamber is provided by a spigot 28 on the flange 25 which fits in a groove 29 on the flange 27, a steam-tight joint being made by a gasket 30.

With the gland thus far described, water or other counter-pressure liquid running back from the throat of the gland to the low pressure end (the end remote from the vulcanising chamber, at which the cable enters) will pass out directly through that end of the gland. This outflow may hinder inspection of the cable at the entrance to the gland. Accordingly we prefer to make the holder extend beyond the outer bush 2 of the two bushes forming the core of the gland and to fit a third bush 31 which is shaped to form a second throat portion 32 and an adjoining outwardly flared portion 33 extending to or approaching the low pressure end of the holder 1. Between this bush 31 and the neighbouring bush 2 is a gap forming an annular port 34 leading to an annular outlet chamber 35 formed by a second circumferential groove in the internal surface of the holder. From this outlet chamber 35 the bulk of the surplus counter-pressure liquid escapes through a port 36, preferably by way of a second detachable annular chamber 37 which when applied, as shown, to a conical surface 38 on the holder also helps to hold together the two halves of the split part 1a of the holder. The remainder of the surplus liquid escapes through the third bush 31 and serves to lubricate the bush, which acts as an approximate centering device for the cable 10.

It should be appreciated that the invention is not limited to glands which are built up of an outer body and of a separable core or centre and that the invention is equally applicable to glands in which core and body are integral. However, the form of gland described with reference to the drawing is preferred because sets of bushes giving throated apertures of different shapes and sizes may be provided. These can readily be interchanged to adapt the gland to deal with cables or other articles of different cross-sectional dimensions within a range of dimensions.

What we claim as our invention is:

1. In a sealing gland for the point of entry into a vessel containing fluid under high pressure of a longitudinally travelling elongated body continuously moving in one direction with respect to the gland, between which body and the internal wall of the gland is a clearance, inclined means in the gland directed toward the outlet end of the gland and communicating with the clearance, said inclined means serving to deliver an annular stream of liquid to the clearance exerting in said clearance a counterpressure to the pressure exerted by the fluid in the vessel, said annular stream being inclined with respect to the direction of travel of said elongated body and having a substantial component of movement in said direction of travel.

2. A sealing gland for the point of entry into a vessel containing fluid under high pressure of a longitudinally travelling elongated body, said gland having for the elongated body a passage which includes a pair of substantially conical portions and a central throat portion of short length relative to that of said conical portions towards which throat portion said substantially conical portions converge, said gland having for the feeding of counter-pressure liquid to said passage an annular chamber surrounding said passage, a circumferential wall separating said chamber from said passage and an annular port in said wall leading from said annular chamber to the interior of the throat portion of said passage, said port having an innermost part inclined at a substantial angle to the axis of said passage and directed towards the outlet end of said gland whereby to impart to counter-pressure liquid flowing into said throat portion from said chamber a substantial component of movement in an axial direction toward the outlet end of said gland.

3. A sealing gland for the point of entry into a vessel containing fluid under high pressure of a longitudinally travelling elongated body, said gland comprising a passage for the elongated body including a pair of substantially conical portions and a central throat portion of relatively short length towards which said conical portions converge, an annular feed chamber surrounding said passage, a wall between said feed chamber and said passage, an inclined annular port in said wall leading from said feed chamber to said throat portion of said passage and directed towards the outlet end of said gland for imparting to liquid flowing under pressure from said feed chamber into said throat a substantial component of movement in an axial direction towards the outlet end of said gland, a second annular chamber surrounding said passage, and a plurality of longitudinally extending ports in the wall of said gland for conveying counter-pressure liquid from the second said chamber to said feed chamber.

4. A gland as specified in claim 3 wherein said second annular chamber lies nearer the outlet end of the gland than said annular feed chamber, whereby it forms a low-temperature barrier for reducing transfer of heat to the throat portion of said passage by conduction along the wall of said gland.

5. A sealing gland for the point of entry into a vessel containing fluid under high pressure of a longitudinally travelling elongated body, said gland comprising a passage for the elongated body including a pair of substantially conical portions and a central throat portion of relatively short length towards which said conical portions converge, an annular feed chamber surrounding said passage, a wall between said feed chamber and said passage, an inclined annular port in said wall leading from said feed chamber to said throat portion of said passage and directed towards the outlet end of said gland for imparting to liquid flowing under pressure from said feed chamber into said throat portion a substantial component of movement in an axial direction towards the outlet end of said gland, a detachable ring fitting on the circumferential surface of said gland and having an internal groove constituting a second annular chamber surrounding said circumferential surface, and longitudinally extending ports in the wall of said gland leading from said annular feed chamber and extending to the surface of said gland facing said groove in said detachable ring.

6. A sealing gland for the point of entry into a vessel containing fluid under high pressure of a longitudinally travelling elongated body, comprising a tubular holder and means for mounting said holder at the point of entry into the vessel, a core housed in said holder and comprising a pair of axially aligned bushes having internal surfaces which together form a pair of substantially conical portions which converge towards a central relatively short throat portion lying partly in one bush and partly in the other, said bushes having their adjacent end faces conical, one of said faces forming a recess and the other a projection which enters said recess, said tubular holder having in its internal surface a circumferentially extending groove connected to the interior of the throat portion of said core by an inclined annular port formed by a clearance between the conical end faces of said bushes and having in its wall at least one port for conveying liquid under pressure through its wall to the interior of said circumferentially extending groove, said mounting means being adapted to mount said holder with said inclined annular port pointing towards the interior of the vessel.

7. A sealing gland for the point of entry into a vessel containing fluid under high pressure of a longitudinally travelling elongated body, comprising a tubular holder built up of two portions making joint on a diametral plane and a third portion having an end face adapted to register and make joint with the adjoining end faces of the first two portions, a core housed in said holder comprising a pair of axially aligned bushes having internal surfaces which together form a pair of substantially conical portions which converge towards a central relatively short throat portion lying partly in one bush and partly in the other, and means comprising interengaging surfaces on said bushes and the first two portions of said holder, for axially locating said bushes in said holder and in spaced relationship to one another whereby their adjacent end surfaces form the walls of an annular inclined port directed towards the outlet end of said gland for imparting to liquid flowing under pressure into the throat portion of said passage a substantial component of movement in an axial direction towards the outlet end of said gland, said holder having in its internal surface a circumferentially extending groove connected to the interior of the throated passage by said annular inclined port and having in its wall at least one port for conveying liquid under pressure through its wall to the interior of said circumferentially extending groove.

8. A sealing gland for the point of entry into a vessel containing fluid under high pressure of a longitudinally travelling elongated body, said gland having a walled passage for the elongated body which includes a throat portion and portions which converge towards said throat portion which is of short length relative to that of each of said converging portions, an annular feed chamber surrounding said throat portion, an inclined annular port connecting said feed chamber with the interior of said throat portion and directed towards the outlet end of said gland for imparting to liquid flowing under pressure from said feed chamber into said throat portion through said port a substantial component of movement in an axial direction towards the outlet end of said gland, an annular outlet chamber surrounding said passage, said passage also having between its inlet end and said converging portions a second throat portion and an adjoining outwardly flared portion between said second throat portion and the inlet end of said gland, and the wall of said passage having an annular port opening into said passage at a point between the said first and second throat portions for conveying to said outlet chamber liquid running back from said first throat portion towards the inlet end of said gland.

9. A sealing gland for the point of entry into a vessel containing fluid under high pressure of a longitudinally travelling elongated body, said gland having a walled passage for the elongated body which includes a throat portion and portions which converge towards said throat portion which is of short length relative to that of each of said converging portions, an annular feed chamber surrounding said throat portion, an inclined annular port connecting said feed chamber with the interior of said throat portion and directed towards the outlet end of said gland for imparting to liquid flowing under pressure into said throat portion through said port a substantial component of movement in an axial direction towards the outlet end of said gland, an annular outlet chamber surrounding said passage, a detachable ring fitting on the circumferential surface of said gland and having an internal groove constituting a third annular chamber surrounding said passage near its inlet end, at least one port in the wall of said gland connecting said annular outlet chamber with said third annular chamber, said passage also having between its inlet end and said converging portions a second throat portion and an adjoining outwardly flared portion between said second throat portion and the inlet end of said gland, and the wall of said passage having an annular port between said passage and said annular outlet chamber, the last said port opening into said passage at a point between the said first and second throat portions whereby to convey to said outlet chamber liquid running back from said first throat portion towards the inlet end of said gland.

References Cited in the file of this patent
UNITED STATES PATENTS

| Number | Name | Date |
|---|---|---|
| 719,460 | Goosmann | Feb. 3, 1903 |
| 1,598,320 | Sherrick | Aug. 31, 1926 |
| 1,996,780 | Wheeler | Apr. 9, 1935 |
| 2,069,087 | Forstrom et al. | Jan. 26, 1937 |
| 2,291,344 | Powell | July 28, 1942 |
| 2,507,310 | Lodge | May 9, 1950 |
| 2,509,699 | Sherrill | May 30, 1950 |